Jan. 25, 1966   L. A. KUBICEK ETAL   3,230,798
DEBURRING TOOLS

Filed July 6, 1964   3 Sheets-Sheet 1

INVENTORS.
Louis A. Kubicek
Joseph L. Toth
BY

Jan. 25, 1966 L. A. KUBICEK ETAL 3,230,798
DEBURRING TOOLS
Filed July 6, 1964 3 Sheets-Sheet 2
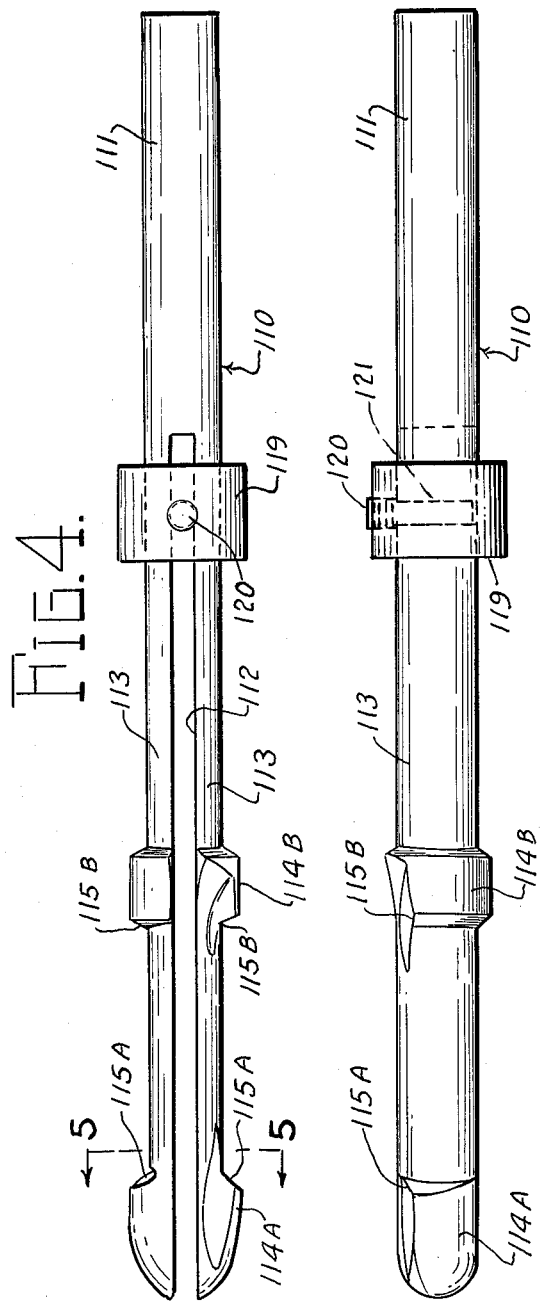
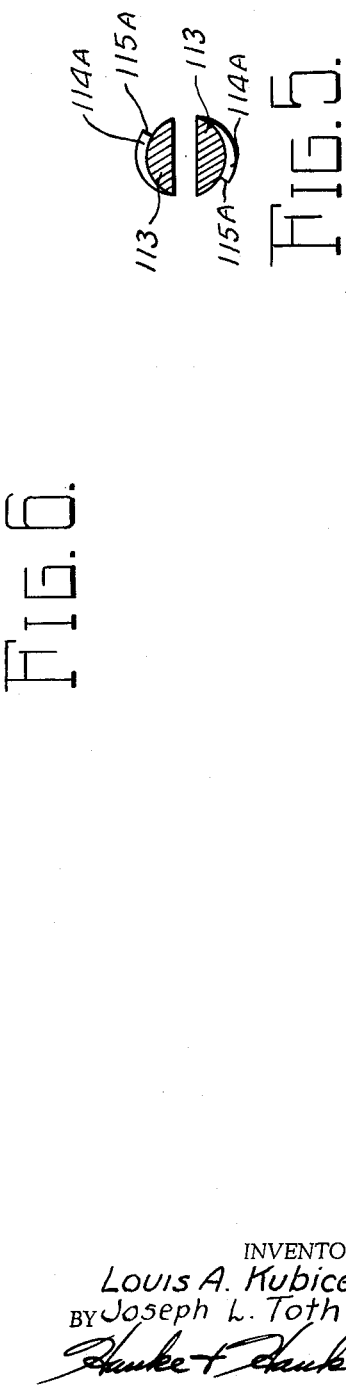
INVENTOR.
Louis A. Kubicek
BY Joseph L. Toth
ATTORNEYS Jan. 25, 1966  L. A. KUBICEK ETAL  3,230,798
DEBURRING TOOLS Filed July 6, 1964  3 Sheets-Sheet 3

INVENTORS.
LOUIS A. KUBICEK
JOSEPH L. TOTH
BY

United States Patent Office 3,230,798
Patented Jan. 25, 1966

3,230,798
DEBURRING TOOLS
Louis A. Kubicek, 18345 Weaver St., and Joseph L. Toth, 11376 Fielding Ave., both of Detroit, Mich.
Filed July 6, 1964, Ser. No. 385,822
14 Claims. (Cl. 77—73.5)

The present application is a continuation-in-part of our now abandoned application Serial No. 174,015, filed February 19, 1962.

The present invention relates to tools and more particularly to an improved tool for removing the burrs formed on the edges of drilled holes.

When holes are drilled, ridges or burrs are often produced on the surfaces of the material being drilled. Generally it is necessary or desirable to remove these burrs to facilitate assembly or to produce a finished product. Tools which have been heretofore developed to accomplish this task are provided with peripheral, axially spaced cutting edges and are adapted to be inserted through the material to remove the burrs formed on each of the surfaces thereof. This eliminates any need for turning over the material and the deburring can be done on both sides of the material in a single operation.

One such tool has been heretofore provided in the form of a pair of spaced spring arms which are adapted to flex toward and away from one another and with each of the arms having adjacent the free end thereof, a cutting tool formed with a cutting edge which extends generally transversely of the longitudinal axis of the arms. The burr formed on the leading edge of the surface of the material is removed upon the tool being inserted into the material. The burr formed on the back edge of the drilled hole is removed upon the tool being withdrawn from the material. Some means of adjusting the outward tension of the spring arms of such a tool is desirable since the force required to drive the tool through the workpiece and to then retract the tool from the workpiece will determine the amount of material which will be removed. Further, harder materials will require that the spring arms resist inward flexing to a greater degree than when the tool is used with relatively soft materials. Heretofore such deburring tools have been provided with an axially inserted pin which can be adjusted to vary the outward tension on the spring arms or columns. Such a construction has the disadvantage that adjustment cannot be accomplished without removing the tool from the machinery being utilized to rotate the tool. Further, the provision of such a pin limits the type of shanks which can be provided for the tool.

It is an object then of the present invention to reduce the cost of deburring holes by providing a deburring tool of this type having means for varying the tension at the cutting edges which can be adjusted without removing the tool from the driving machinery.

It is another object of the present invention to eliminate the need for special means to hold deburring tools of this type by providing tension adjusting means therefore which permits the shank of the tool to be formed in any desirable manner.

It is yet another object of the present invention to reduce the cost of manufacturing deburring tools of this type by providing a simply constructed tension adjusting means.

It is still another object of the present invention to improve deburring tools of this type by providing such a tool having a pair of axially spaced cutting ridges with the forward cutting ridge having an edge for cutting material at the inside edge of the hole and with the rearward ridge having a cutting edge for removing material at the outside edge of the hole.

Still further objects and advantages of the present invention will readily occur to one skilled in the art to which the invention pertains upon reference to the following drawings in which like characters refer to like parts throughout the several views in which FIG. 1 is a side elevational view of one preferred embodiment of the present invention.

FIG. 4 is an elevational side view of another preferred embodiment of the present invention.

FIG. 5 is a cross-sectional view taken substantially at line 5—5 of FIG. 4.

FIG. 6 is an elevational top view of the preferred embodiment shown in FIGS. 4 and 5.

Figure 1:
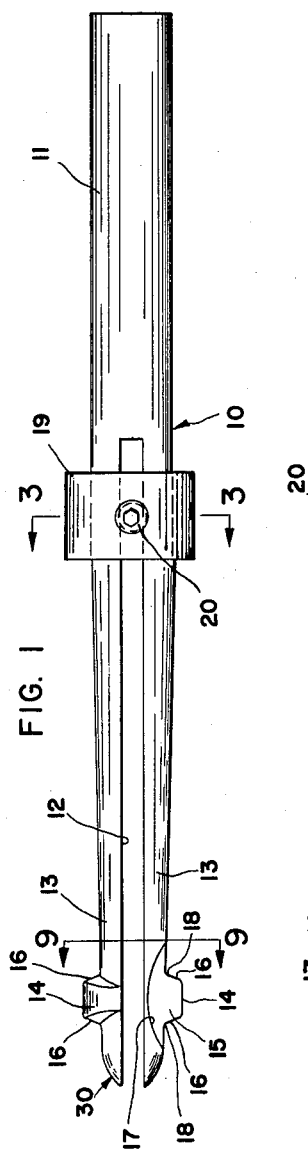
Figure 2:
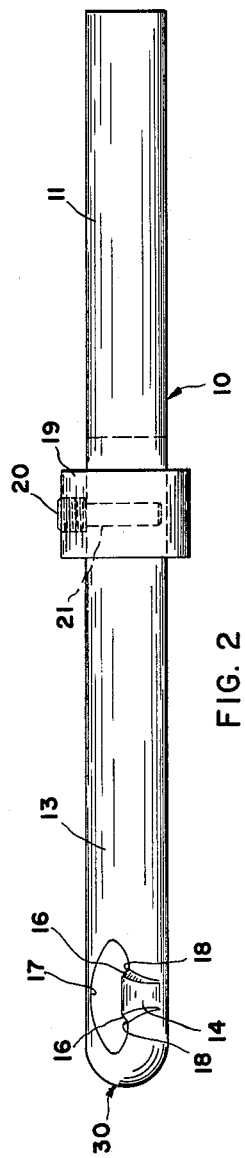
FIG. 2 is an elevational top view of the preferred embodiment shown in FIG. 1.
Figure 3:
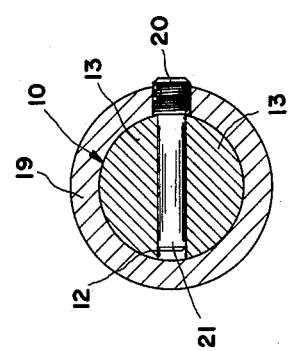
FIG. 3 is a cross-sectional view taken substantially on line 3—3 of FIG. 1 and enlarged somewhat for purposes of clarity.
Figure 9:
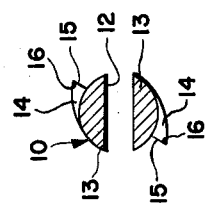
FIG. 8 is a view similar to FIG. 7 but illustrating the preferred embodiment of FIG. 4 in use and FIG. 9 is a cross sectional view taken substantially at line 9—9 of FIG. 1.
Figure 7:
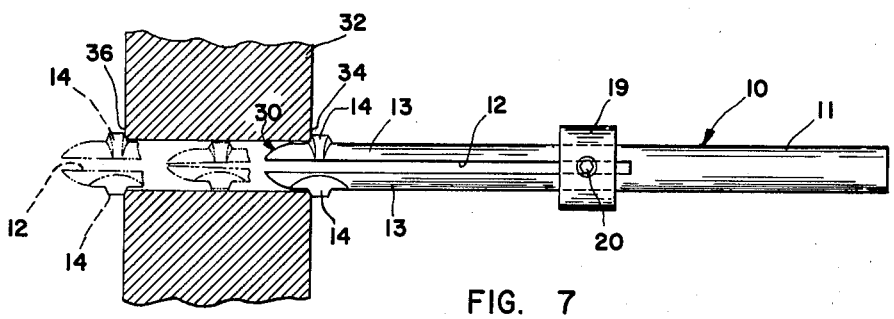
FIG. 7 is an elevational view, partly in section, showing the preferred embodiment of FIG. 1 in use.

Now referring to the drawings for a more detailed description of the present invention, FIGS. 1–3, 7 and 9 illustrate a preferred deburring tool as comprising an elongated body member 10 having a shank portion 11 adapted for insertion into a suitable driving mechanism (not shown). The body member 10 is provided with a longitudinally extending tension slot 12 forming a pair of substantially parallel and symmetrical support columns or arms 13. Substantially arcuate cutting ridges 14 are provided on the periphery of the support columns 13. The cutting ridges 14 are spaced axially somewhat from the free ends of the support columns 13 and the ends of the support columns 13 are rounded to define a pilot portion 30. The cutting ridges 14 are provided with substantially radially extending flat surface portions 15. These are disposed in substantially parallel planes on opposite sides of the body member 10 and provide sharp cutting edges 16 on each side of ridges 14. The support columns may be dished as at 17 to produce sharp corner edges 18.

A collar 19 is slidably mounted on the support columns 13 and is retained in position by means of a set screw 20 integrally carrying a pin 21 disposed to extend inwardly into the tension slot 12. When the set screw 20 is tightened against the outer surface of the support columns 13, as can best be seen in FIG. 3, the pin 21 provides a fulcrum for the support columns 13 at the point of adjustment so that the tension and flexibility of the support arms or columns 13 will depend upon the longitudinal position of the collar 19.

In operation the shank portion 11 is inserted into any convenient source of standard rotary driving mechanism. It is apparent that the shank portion may be fashioned into any desirable shape without affecting the tension adjusting means. This eliminates the need for expensive special holders. The tool is then inserted into a workpiece 32 having the hole to be deburred, as can best be seen in FIG. 7, until the cutting ridges 14 are closely adjacent to the forward edge 34 of the hole. The tool is then rotated and the cutting edges 16 will remove the burr formed on the outer peripheral edge of the hole of the material which has been drilled. After this burr had been removed, the tool is then inserted farther into the hole until the cutting ridges 14 emerge from the other side of the material. The slot 12 permits the arms or columns 13 to be flexed inwardly to permit passage of the ridges 14 through the hole as shown in dashed lines in FIG. 7. It is apparent that the slot 12 must be sufficiently wide to permit the cutting ridges 14 to pass through the hole. In those uses in which the body member 10 is slightly less than the diameter of the hole the width of the slot 12 will be preferably slightly greater than the difference between the diameters of the body member 10 and the cutting ridges 14. The tool continues to be rotated and is then retracted from the material so that the cutting edges 16 will remove the burr formed on the rear edge 36 of the hole.

It is apparent that the force required to drive the tool through the material and to retract the tool from below the bottom face of the material will determine the degree of deburring performed. For example, if the pressure required to collapse the support columns 13 is very slight and the material to be worked on is very hard, the support columns 13 may be so easily moved together that the cutting ridges 14 will pass into and out of the hole without removing the burrs formed at the edges of the hole. Further, if the material is very soft and the force required to flex the support columns 13 toward one another is relatively high, too much of the material at the edges of the drilled hole may be removed upon forcing the tool through the hole and retracting it. Therefore, some means of adjusting the force required to flex the support columns 13 is necessary. In the present invention such means is provided by the collar 19 and the pin 21. If tension adjusting is necessary, this can be accomplished without removing the tool from the driving mechanism or the hole in which it may be inserted. The set screw 20 is loosened and the collar 19 is moved along the support column 13 until the pin 21 is positioned to produce the desired tension, the tension being determined by the length formed between the free ends of columns 13 and the pin 21. The set screw 20 is again tightened thus locking the collar 19 and the pin 21 to the support columns 13.

In the preferred embodiment of the present invention illustrated in FIGS. 4–6, and 8, an elongated body member 110, is provided with a shank portion 111 and a longitudinally extending tension slot 112. The slot 112 forms a pair of support columns or arms 113. Spaced cutting ridges 114A and 114B are provided on the outer periphery of the support columns 113. The cutting ridges 114A are each provided with a trailing cutting edge 115A and the cutting ridges 114B are each preferably provided with an inclined leading cutting edge 115B. If a tension adjusting means is desired in the embodiment illustrated in FIGS. 4–6, and 8 it can take the form of a collar 119 slidably mounted on the support columns 113 and provided with a set screw 120 retaining the pin 121 substantially as described above with reference to FIGS. 1–3, and 7.

Figure 8:
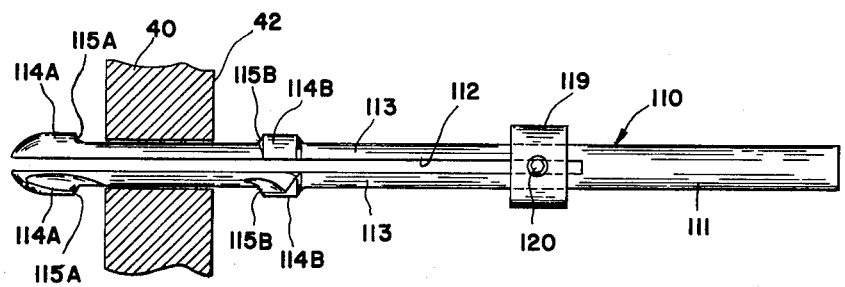

As illustrated in FIG. 8 the preferred embodiment of FIGS. 4–6 is used to perform the same function as the embodiment disclosed above but is used somewhat differently. Upon insertion of the tool through the material 40 as illustrated in FIG. 8 no cutting action is performed. When the tool is positioned with the material 40 intermediate the cutting ridges 114A and 114B and with the tool rotating, the tool is moved forwardly and rearwardly to bring the cutting edges 115A–115B in turn against the opposite surfaces of the drilled material 130. The inclined cutting edge 115B will produce a chamfer on the forward face 42 of the material but it is apparent the cutting ridge 114B can be fashioned to perform just a deburring operation.

The embodiment illustrated in FIGS. 4–6, and 8 has several important advantages. The cutting ridge 114B can be constructed of any diameter since it does not pass through the hole in the material. This permits chamfer operations of various diameters to be performed on the forward surface of the drilled material. Further, since the extent of material being removed on the forward face thereof is not dependent upon the tension of the support columns 113, the operator of the tool can use it to remove as much material as he desires before removing or retracting the tool from the material. Also since the material is positioned intermediate the cutting ridges 114A and 114B the operator of the tool has greater control of the operation and the changes of the tool becoming misaligned with the drilled hole are substantially diminished.

It is apparent from the foregoing description of the present invention that deburring tools of an improved construction have been provided. In each of the embodiments illustrated tension adjustment can be performed without the necessity of removing the tool from the driving mechanism or the workpiece. Further, the particular means employed permits any desired variation to be made in the shank portion without interferring with the tension adjusting means and without requiring expensive special holders. In the embodiment illustrated in FIGS. 4–6, and 8, a tool has been provided in which burrs formed at each end of a hole can be readily removed but in which the operator has greater control over the cutting action at the leading edge of the hole.

It is further apparent that many types of cutting edges may be utilized and that many other changes can be made without departing from the spirit of the invention as expressed by the scope of the appended claims.

We claim:

1. A tool for removing the burrs formed on the edge of drilled holes, said tool comprising,
    (a) an elongated body member having a longitudinal slot extending from one end of said body member to a point spaced from the other end of said body member,
    (b) cutting means carried on the outer periphery of said body member,
    (c) a collar adjustably longitudinally slidably mounted on said body member, and
    (d) means carried by said collar and extending into said slot to engage the sides of said body member whereby as said collar is moved longitudinally on said body member said last mentioned means provides a fulcrum which varies the tension of said cutting means.

2. The tool as defined in claim 1 and in which said cutting means comprises
    (a) a pair of axially spaced substantially arcuate ridges providing on the outer surface of said body member,
    (b) said ridges each being provided with a substantially radially extending cutting edge.

3. The tool as defined in claim 1 and in which said cutting means comprises
    (a) a pair of substantially arcuate ridges provided on the outer periphery of said body member,
    (b) said ridges being provided with face portions substantially co-planar with respect to a plane containing the longitudinal axis of said body member, and
    (c) each of said face portions forming a pair of spaced cutting edges.

4. A deburring tool comprising,
    (a) an elongated body member having a shank portion and a longitudinally extending slot spaced from said shank portion,
    (b) said slot forming a pair of symmetrical longitudinally extending support columns,
    (c) tension adjusting means adjustably slidably mounted on said support columns,
    (d) cutting means carried on the outer periphery of said support columns,
    (e) said tension adjusting means including
        a collar slidably mounted on said support columns,
        a set screw carried by said collar and extending into said slot, and
        a pin integrally carried on the end of said set screw and extending into said slot.

5. The tool as defined in claim 4 and in which said cutting means comprises,
   (a) a substantially arcuate cutting ridge carried on the outer periphery of said support columns,
   (b) said cutting ridge being provided with a pair of substantially radially extending flat surfaces,
   (c) said radially extending flat surfaces being disposed in substantially parallel planes.

6. The tool as defined in claim 4 and in which said cutting means comprises,
   (a) a pair of spaced substantially arcuate ridges provided on the outer surface of said support columns and
   (b) each of said ridges being provided with a pair of substantially parallel radially extending flat surfaces.

7. The tool as defined in claim 4 and including chamfer means carried on the outer periphery of said support columns.

8. A deburring tool comprising
   (a) a cylindrical body having a through slot formed therein and extending axially to one end of the body to provide a pair of spaced apart support columns which are adapted to flex toward and away from one another,
   (b) said support columns forming integral extensions of the unslotted portion of the body,
   (c) said support columns each having adjacent but spaced axially inwardly of the free end thereof a cutting tool comprising a radial enlargement formed with a cutting edge which extends generally transversely of the longitudinal axis of said slot,
   (d) the opposed inner faces of said support columns defining the opposite sides of said slot,
   (e) the free ends of said support columns extending beyond said cutting tools comprising a pilot portion of smaller radius than said cutting tools,
   (f) a collar adjustably longitudinally slidably mounted on said support columns, and
   (g) means carried by said collar and extending into said slot to engage the sides of said support columns whereby as said collar is moved longitudinally on said support columns said last mentioned means provides a fulcrum which varies the tension of said support columns.

9. The deburring tool as defined in claim 8 and in which each cutting tool adjacent the free end of said support columns is provided with a plurality of said cutting edges one located at each of the axially opposite ends of said radial enlargement.

10. The deburring tool as defined in claim 8 and including a second cutting tool provided on each of said support columns axially spaced from and intermediate the unslotted portion of said body and said first mentioned cutting tools.

11. A deburring tool comprising
   (a) a cylindrical body having a through slot formed therein and extending axially to one end of the body to provide a pair of spaced apart support columns which are adapted to flex toward and away from one another,
   (b) said support columns forming integral extensions of the unslotted portion of the body,
   (c) said support columns each having adjacent but spaced axially inwardly of the free end thereof a cutting tool comprising a radial enlargement formed with a cutting edge which extends generally transversely of the longitudinal axis of said slot,
   (d) the opposed inner face of said support columns defining the opposite sides of said slot,
   (e) a collar adjustably longitudinally slidably mounted on said support columns, and
   (f) means carried by said collar and extending into said slot to engage the sides of said support columns whereby as said collar is moved longitudinally on said support columns said last mentioned means provides a fulcrum which varies the tension of said support columns.

12. A deburring tool comprising
   (a) a cylindrical body having a through slot formed therein and extending axially to one end of the body to provide a pair of spaced apart support columns which are adapted to flex toward and away from one another,
   (b) said support columns forming integral extensions of the unslotted portion of the body,
   (c) said arms each having a pair of arcuate ridges provided on the outer surfaces thereof,
   (d) said ridges each being provided with a substantially radially extending cutting edge,
   (e) the opposed inner faces of said support columns defining the opposite sides of said slot,
   (f) a collar adjustably longitudinally slidably mounted on said support columns, and
   (g) means carried by said collar and extending into said slot to engage the sides of said support columns whereby as said collar is moved longitudinally on said support columns said last mentioned means provides a fulcrum which varies the tension of said support columns.

13. A deburring tool comprising
   (a) a cylindrical body having a through slot formed therein and extending axially to one end of the body to provide a pair of spaced apart support columns which are adapted to flex toward and away from one another,
   (b) said support columns forming integral extensions of the unslotted portion of the body,
   (c) said support columns each having adjacent but spaced axially inwardly of the free end thereof a first cutting tool comprising a radial enlargement formed with a cutting edge which extends generally transversely of the longitudinal axis of said slot,
   (d) said support columns further each having a second cutting tool axially spaced from and intermediate the unslotted portion of said body and said first cutting tool, said second cutting tool comprising a second radial enlargement which extends generally transversely of the longitudinal axis of said slot.

14. The deburring tool as defined in claim 13 and in which the width of said slot is greater than the difference in diameters between the cylindrical body and the circle formed by the radial enlargement forming said first cutting tool.

No references cited.

WILLIAM W. DYER, JR., *Primary Examiner.*